United States Patent Office 3,540,046
Patented Nov. 10, 1970

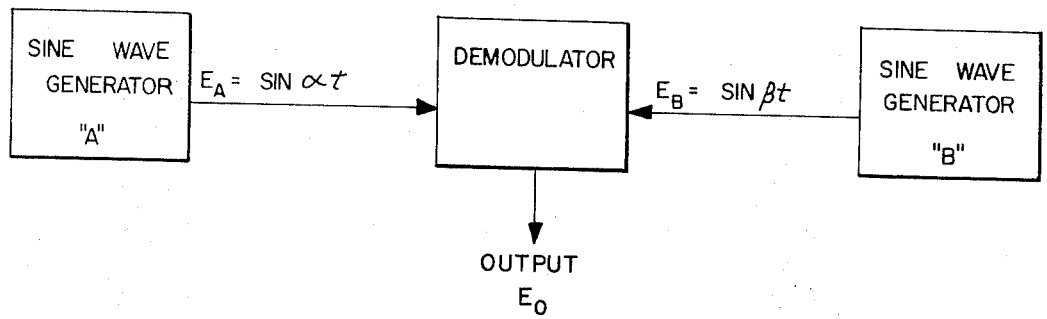
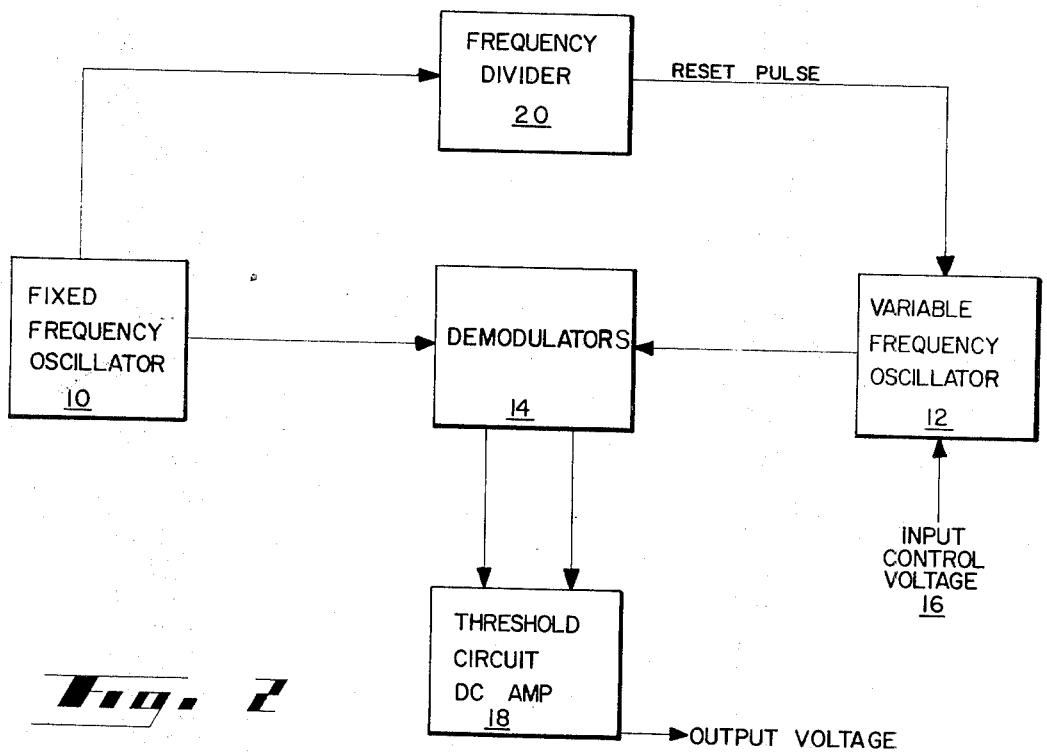

3,540,046
ANTENNA PATTERN GENERATOR
Bernd Falk, Fort Worth, Tex., assignor to General Dynamics Corporation, Fort Worth, Tex., a corporation of Delaware
Filed Dec. 18, 1968, Ser. No. 784,642
Int. Cl. G01s 7/40; G09b 9/00
U.S. Cl. 343—17.7
6 Claims

ABSTRACT OF THE DISCLOSURE

A circuit and related method for reproducing antenna patterns for simulation applications by demodulation of the outputs from a fixed frequency oscillator and a variable frequency oscillator, thus generating the characteristic sin $X/X$ functions and variations thereof which are utilized in simulating the desired antenna patterns. This reproduction of antenna patterns is accomplished by generating an output voltage which is proportional to the instantaneous gain of a simulated antenna in response to an input voltage which is proportional to the instantaneous antenna pointing angle.

---

The invention herein described was made in the course of or under a contract or subcontract thereunder, with the Department of the Air Force.

The present invention relates generally to a method for generating antenna patterns for radar simulation applications.

More particularly this invention is directed to a method for electronically and selectively generating the characteristic sin $X/X$ functions and variations thereof utilized in radar simulation of antenna patterns.

PRIOR ART

In the past, several methods for generating antenna patterns for radar simulation applications have been utilized. One of the most useful and flexible devices for accomplishing this is the photoformer function generator. This device allows reproduction of actual measured patterns in great detail.

The photoformer function generator generates a voltage proportional to antenna gain as a function of antenna angle with respect to the target. This is accomplished by placing an opaque mask immediately in front of a cathode ray tube and a photoelectric cell some distance from the mask. With the cathode ray tube spot above the mask, light shines into the photoelectric cell which in turn produces an output so as to drive the spot down. However, as the spot reaches the mask edge, the light seen by the photocell will decrease and the spot will cease moving downward. The result is that the spot always comes to equilibrium at the edge of the mask. The voltage on the Y axis deflection plates then represents the output and is proportional to mask height.

These masks represent antenna gain as a function of angle which can be accurately plotted and are made of film mounted on plexiglass disks for facilitating interchangeability.

Photoformer function generators are extremely accurate and simple to use but are expensive and not as flexible in usage as is desired.

Search for more economical methods of simulated antenna pattern generation has resulted from the high cost of photoformer function generators. One of the alternates found was the tapped RF delay line technique. This technique is reasonably practical where it is unnecessary to reproduce an actual pattern in infinite detail but it remains limited in this respect.

The prior art has several inherent disadvantages which the present invention obviates. The more prevalent of these deleterious shortcomings are the expense of the photoformer function generator and the impreciseness of the tapped RF delay line technique, both of which are solved by use of the present invention.

Therefore, in view of the above, it is the primary object of this invention to provide an inexpensive method of generating antenna patterns for use in simulation applications.

A further object of this invention is to provide a method for generating varied antenna patterns for use in radar simulation applications which is easily adjustable so as to offer a more accessible array of pattern simulations.

The invention will be readily understood by those versed in the art when taken in context of the following specification and related drawings, wherein:

FIG. 1 diagrammatically illustrates the situation existing if a given signal is demodulated by another signal in accordance with the invention; and FIG. 2 is a block diagram of a system according to the present invention which is capable of instrumentation on a printed circuit card.

FIG. 1 depicts two signal sources A and B operating on frequencies $\alpha$ and $\beta$, both sources generating sine wave voltage outputs $E_A$ and $E_B$ respectively, and wherein signal $E_A$ is demodulated by signal $E_B$.

Assuming the demodulator is a perfect multiplier, the output signal $E_o$ is given by:

$$E_o = (E_A \sin \alpha t)(E_B \sin \beta t)$$
$$= E_A E_B \sin \alpha t \sin \beta t$$

If $E_o$ is filtered so that only the DC component is recovered, $E_o$ results are determined as:

$$E_o' = \frac{1}{T}\int_0^T E_o$$

$$= \frac{E_A E_B}{T}\int_0^T \sin \alpha t \sin \beta t$$

$$= \frac{E_A E_B}{T}\left[\frac{\sin(\alpha-\beta)t}{2(\alpha-\beta)} - \frac{\sin(\alpha+\beta)t}{2(\alpha+\beta)}\right]_0^T$$

If $(\alpha+\beta) \gg (\alpha-\beta)$ then $\dfrac{\sin(\alpha+\beta)t}{2(\alpha+\beta)} \ll \dfrac{\sin(\alpha-\beta)t}{2(\alpha-\beta)}$ Therefore, $E_o'$ reduces to $$\frac{E_A E_B}{T} \frac{\sin(\alpha-\beta)T}{2(\alpha-\beta)}$$

The above expression is that of the desired sin $X/X$ form.

A working system must include a method to set both oscillators in phase at $t_o$. Also performed is the choosing of some convenient value of T. The input to the system must control the frequency of one or both oscillators.

FIG. 2 shows in block diagram form a system according to the invention which is capable of instrumentation on a printed circuit card. The outputs of a fixed frequency oscillator 10, and a voltage controlled variable frequency oscillator 12, are demodulated by demodulators 14. Input control voltage 16 adjusts the frequency of variable frequency oscillator 12 to introduce the independent variable (i.e., the instantaneous pointing angle of the antenna) into the system. Phase lock between the two oscillators 10, 12 is reestablished every 10–20 cycles of the fixed frequency oscillator 10 through frequency divider 20. Since a uni-polar output voltage is desired, the output is taken from two out-of-phase demodulators 14 and a variable threshold is applied at threshold circuit and DC amplifier 18 to the outputs of each of the demodulators 14.

Different gains may also be set for the even and odd lobes of the pattern, thus allowing some reasonable adjustment of output waveshape.

In summary the present invention provides an inexpensive, dependable and easily controllable method for generating the characteristic sin $X/X$ functions and variations thereof which are utilized in simulating desired antenna patterns in radar simulators. The reproduction of these antenna patterns is accomplished by generating an output voltage which is proportional to the instantaneous gain of a simulated antenna in response to an input voltage which is proportional to the instantaneous antenna pointing angle relative to the target of interest.

I claim:

1. The method for generating characteristic sin $X/X$ functions and variations thereof for simulating antenna patterns, comprising:
   (A) generating a frequency proportional to the instantaneous antenna pointing angle relative to the target of interest;
   (B) comparing said frequency to a second frequency; and
   (C) generating an output voltage responsive to said comparison which is proportional to the instantaneous gain of said simulated antenna.

2. The method for simulating antenna patterns defined by claim 1 wherein:
   (A) said comparison is accomplished by:
      (1) demodulating the outputs of a fixed frequency oscillator and a voltage controlled variable frequency oscillator through out-of-phase demodulators,
      (2) deriving a uni-polar voltage from the voltage resultant from said demodulating step;
   (B) said output voltage is derived from said uni-polar voltage by applying thereto a variable threshold and amplifying the voltage resultant therefrom.

3. The method defined by claim 1 wherein:
   (A) said output voltage is resultant from:
      (1) generating a fixed frequency from a fixed frequency oscillator,
      (2) generating a variable frequency from a variable frequency oscillator,
      (3) adjusting the frequency of said variable frequency by a control input voltage to said variable frequency oscillator to thus introduce the independent variable instantaneous pointing angle of the antenna into the system,
      (4) re-establishing phase lock between said oscillators at periodic intervals,
   (B) said output voltage is uni-polar and derived by:
      (1) demondulating the outputs of said fixed and variable frequency oscillators.

4. The method defined by claim 3 wherein:
   (A) the phase lock between said oscillators is accomplished between each 10 to 20 cycles of said fixed frequency oscillator,
   (B) said demodulation is accomplished by two out-of-phase demodulators, applying a variable threshold to the output of each demodulator, and amplifying the uni-polar output resultant therefrom.

5. An antenna pattern generator comprising:
   (A) means generating a frequency proportional to the instantaneous pointing angle of an antenna relative to the target of interest; and
   (B) means generating an output voltage responsive thereto and proportional to the instantaneous gain of the antenna.

6. The antenna pattern generator defined by claim 5, wherein:
   (A) said first named generating means comprises:
      (1) a fixed frequency oscillator,
      (2) a voltage controlled variable frequency oscillator,
      (3) means operative to periodically phase lock said fixed and variable frequency oscillators,
   (B) said second named generating means comprises:
      (1) first and second out-of-phase demodulators operative to demodulate the output of said oscillators,
      (2) a threshold circuit and D.C. amplifier means operative to give a uni-polar output voltage having the characteristic sin $X/X$ functions for simulated antenna patterns of a radar simulator.

References Cited

UNITED STATES PATENTS

| 3,158,672 | 11/1964 | Trinite | 35—10.4 |
| 3,229,289 | 1/1966 | Stine | 343—17.7 |
| 3,278,670 | 10/1966 | Eisenberg et al. | 35—10.4 |
| 3,317,648 | 5/1967 | Pollack | 35—10.4 |

RODNEY D. BENNETT, Primary Examiner

T. H. TUBBESING, Assistant Examiner

U.S. Cl. X.R.

35—10.4